May 9, 1950      P. A. NOXON      2,506,885
INDICATOR
Filed Oct. 31, 1944      2 Sheets-Sheet 1
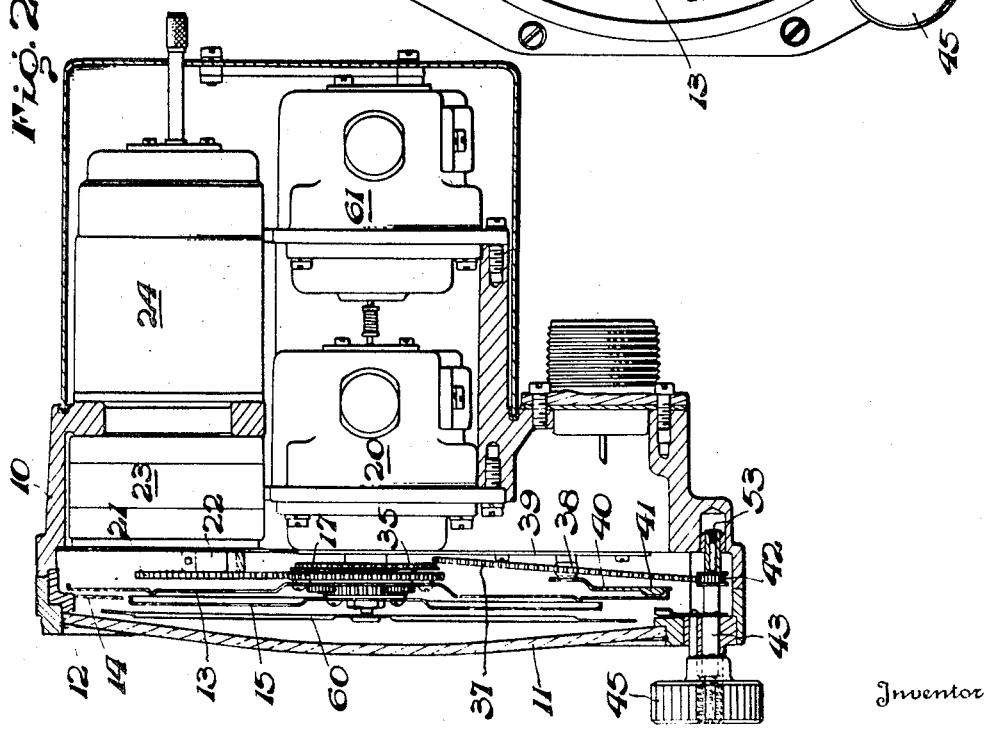
Inventor
Paul A. Noxon
By
Attorney May 9, 1950      P. A. NOXON      2,506,885
INDICATOR
Filed Oct. 31, 1944      2 Sheets-Sheet 2
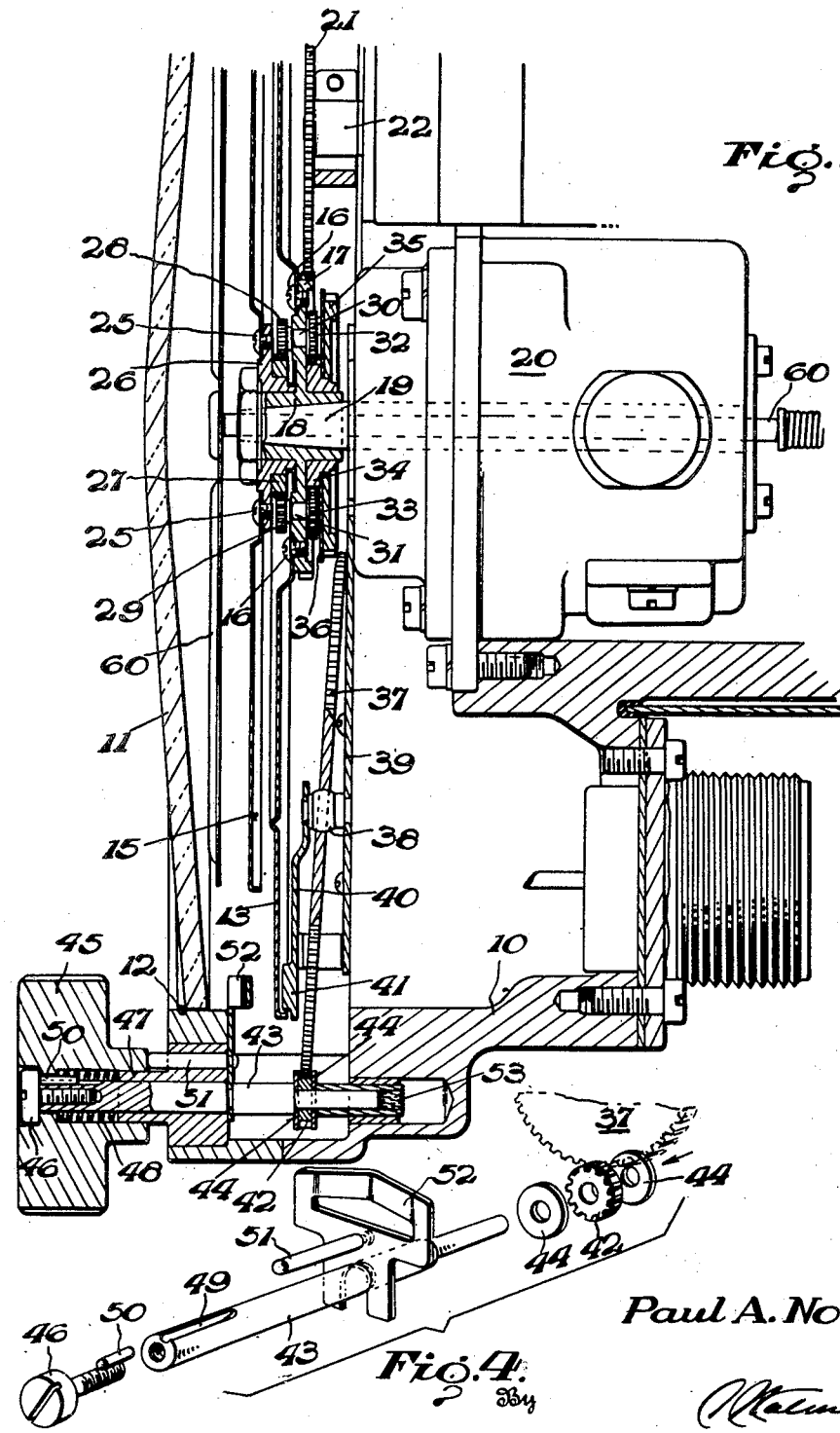
Inventor
Paul A. Noxon
By
Attorney Patented May 9, 1950

2,506,885

UNITED STATES PATENT OFFICE 2,506,885

INDICATOR

Paul A. Noxon, Tenafly, N. J., assignor to Bendix Aviation Corporation, Teterboro, N. J., a corporation of Delaware Application October 31, 1944, Serial No. 561,216

11 Claims. (Cl. 116—129)

This invention relates generally to navigational instruments of the character described and claimed in copending application Serial No. 561,210, filed October 31, 1944, and more particularly to novel setting means for moving one of the two instrument dials relative to the other, the two dials being normally arranged to operate in unison.

In navigational instruments of the character described in the above-mentioned application it is desirable under certain conditions to adjust the course setter dial relative to the compass dial. Moreover, such relative setting must be accomplished without impeding freedom of the compass dial in its response to the magnetic compass which does occur where conventional differential gearing systems are utilized. Since both the compass dial and the course setter dial are normally in frictional engagement for movement in unison it is necessary that in adjusting the course setter dial, the compass dial remain relatively fixed in position.

By means of the present invention, a novel mechanism is provided for accomplishing the desired results in that by operating a knob accessible from the exterior of the instrument the compass dial is clamped and the course setter dial readily moved to any required position without moving the compass dial.

An object of the present invention, therefore, is to provide a novel setting mechanism for an instrument having two or more dials or pointers whereby one dial or pointer may be readily positioned relative to a second dial or pointer.

Another object of the present invention is to provide a novel setting mechanism for an instrument having two or more indicating means which are normally in frictional driving arrangement whereby one of the indicating means is held in a relatively fixed position and the other is readily positioned with respect thereto.

A further object is to provide a novel indicator setting mechanism for instruments which is simple in construction, requires but a minimum number of movable parts, and is rapid and reliable in operation.

The above and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description only, and are not designed as a definition of the limits of the invention.

In the drawings, wherein like reference characters refer to like parts throughout the several views:

Figure 1 is a front plan view of one form of navigational instrument, such as that described and claimed in the above referred to copending application, to which the novel setting mechanism of the present invention may be applied;

Figure 2 is a section view taken substantially along line 2—2 of Figure 1;

Figure 3 is an enlarged view of a portion of the structure of Figure 2; and,

Figure 4 is an exploded perspective view of a portion of the structure of Figure 3.

Referring now to the drawings and more particularly to Figures 1 and 2 thereof, the present invention is shown applied to a navigational instrument of the character described and claimed in the aforementioned copending application. Such instrument comprises generally a casing 10 whose open front end is closed by a transparent cover glass 11 retained in place by means of a suitable retaining ring 12. Visible from the front of the instrument is an outer or compass dial 13 adapted for cooperation with a fixed lubber line 14 carried by the casing and a mask or inner dial 15, both dials being rotatable about a common axis.

Compass dial 13, as shown in Figure 3, is fastened by means of screws 16 to a driven gear 17 which has secured thereto or formed integrally therewith a hub 18 through which gear 17 is fixed to a shaft 19 of an inductive device 20, shaft 19 being hollow for a purpose to presently appear. A driving gear 21 which meshes with gear 17 is carried by a shaft 22 which, in turn, through a reduction gearing arranged within casing 23 (Figure 2) is operated by a two phase induction motor 24. As more fully described in the copending application above referred to, a change in craft heading manifests itself in a signal developed by an earth inductor device which is fed to the stator of inductive device 20 whereupon a signal is generated in the rotor thereof and fed therefrom through an amplifier to the variable phase of motor 24 which, being energized, drives gear 17 through gear 21 until the rotor of device 20 is brought to a null and the motor is de-energized. Compass dial 13 has now been moved angularly relative to lubber line 14 an amount corresponding to the amount of craft change in heading.

Inner dial 15 is fastened by way of screws 25 to a flanged sleeve 26 which is freely mounted on hub 18, the sleeve supporting a gear 27 thereon which meshes with two small pinions 28 and 29 carried by shafts 30 and 31 journalled in gear 17. The opposite ends of these shafts support pinions 32 and 33 thereon which mesh at diametrically opposite points with a gear 34 loosely sleeved on hub 18 and which, moreover, has fastened thereto a relatively large gear 35. The latter gear is provided with a friction surface 36 which normally engages similar friction surfaces on pinions 32 and 33 so that upon movement of gear 17, gear 35 is moved therewith and, the system being locked, dials 13 and 15 will move in unison.

Under certain conditions it is desirable to adjust dial 15 relative to dial 13 and to this end the novel mechanism of the present invention is provided which comprises a relatively large gear 37 mounted for rotation as well as limited lateral motion on a ball type or swivel shaft 38 which is journalled at one end in a plate 39 and at its other end in a stationary bracket 40, the bracket bearing at its free end a shoe 41 arranged closely adjacent the outer periphery of compass dial 13. The lower end of gear 37 is at all times in mesh with a pinion 42 fastened to a shaft 43 between two bearing members 44 which are likewise fixed to the shaft. The free end of shaft 43 is secured to an actuating knob 45, which is accessible from the front of the instrument, by means of a screw 46.

The actuating knob is sleeved on a hollow hub 47 which is pressed into casing 10 and a coil spring 48 is sleeved about shaft 43 and abuts hub 47 and the interior of the knob so that once the knob is pushed inwardly and subsequently released, the coil spring will return it to the position shown in Figure 3. The free end of shaft 43 is further provided as shown in Figure 4 with a groove 49 which receives a pin 50, the purpose of the later being to lock the related end of spring 48 against knob 45. The knob supporting hub 47 is provided with an aperture for the reception of a pin 51 which abuts the knob at one end and at its opposite end supports a spring clamp 52, the lower end of this clamp being split to straddle shaft 43 so that the clamp will move inwardly with pin 51 and shaft 43 but the shaft may be rotated relative thereto.

Inward motion of knob 45 urges shaft 43 to the right into a suitable aperture 53, formed in casing 10, and the shaft by moving also moves pinion 42 whereby the top end of gear 37 is moved to the left into meshing engagement with gear 35 while both shaft 43 and pin 51 move clamp 52 to engage and urge compass dial 13 against shoe 41. Subsequent rotation of knob 45 produces rotation of gear 35 whereupon gear 34 rotates therewith to rotate pinions 32 and 33 as well as pinions 28 and 29. Gear 17 being fixed, pinions 28 and 29 drive gear 27 whereby mask or inner dial 15 is moved angularly relative to the compass dial to any desired position. With the desired adjustment completed, knob 45 is released and coil spring 48 drives the knob to the left, the latter carrying shaft 43 as well as clamp 52 and pinion 42 therewith so that the clamp releases the compass dial while gear 37 is moved to the right out of mesh with gear 35. With subsequent movement of dial 13 relative to lubber line 14, inner dial 15 moves in unison therewith because of the frictional engagement heretofore described.

Compass dial 13, as shown in Figure 1, is provided with graduations 55 reading from 0° to 360° while inner dial 15 is provided with graduations 56 reading from 0° to the left 180° and 180° to the right of the zero index. Etched or otherwise suitable arranged on dial 15 are two spaced parallel grids 57 and 58 which, under certain conditions confine a radio compass needle 59 therebetween, such needle being carried by a shaft 60 which passes through hollow shaft 19 of inductive device 20 to be driven by a radio compass inductive device 61 (Figure 2). Since the details of the compass system for actuating dial 13 and the radio compass system for operating needle 59 constitute no part of the present invention only so much thereof has been shown as is necessary to a clear understanding of the present invention, reference being had to the above-mentioned copending application for a full description of the compass and radio systems.

It will now become apparent to those skilled in the art that a novel and simple setting mechanism has been provided for navigational or other instruments for moving or adjusting one of two indicating means of dials thereof relative to the other without interfering with the setting or action of the second indicating means or dial.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art. For a definition of the limits of the invention, reference will be had primarily to the appended claims.

I claim:

1. In an indicating instrument, the combination of a pair of graduated dials normally movable in unison about a common axis, a rotatable and laterally movable member for setting one of said dials, holding means for the other of said dials to maintain said other dial fixed during setting of said one dial, and common means for operating said holding means and said rotatable and laterally movable member to set said one dial relative to the other.

2. In an indicating instrument, the combination of a pair of indicating means normally adapted for movement in unison, means comprising a swivelled and rotatable member for moving one of said indicating means relative to the other, holding means for the other of said indicating means, and common means for operating said holding means and for swivelling and rotating said member.

3. In an indicating instrument, the combination of a pair of graduated dials normally movable in unison about a common axis, swivelled and rotatable means for moving one of said dials relative to the other, holding means for the other of said dials and common means for operating said holding means and for swivelling and rotating said last-named means.

4. In an indicating instrument, the combination of a pair of graduated dials normally movable about a common axis, a gear system for moving one of said dials relative to the other, holding means for the other of said dials, a rotatable and laterally movable gear member for operating said gear system and normally out of engagement therewith, and means comprising a common actuating member for operating said holding means and for laterally moving said gear member into engagement with said gear system and for rotating said gear member to operate said gear system.

5. In an indicating instrument, the combination of a plurality of indicating means angularly movable about a common axis, one of said indicating means being normally movable in unison with another of said indicating means, a gear system for moving said one indicating means relative to said other indicating means, a rotatable and laterally movable gear member for operating said gear system and normally out of engagement therewith, holding means for the other of said indicating means, and means comprising a common actuating member for operating said holding means and for laterally moving said gear member into engagement with said gear system and for rotating said gear member to operate said gear system.

6. In combination with a pair of indicating means normally adapted for angular movement in unison about a common axis, a gear system for moving one of said indicating means relative to the other, a swivelled and rotatable gear member for operating said gear system and normally out of engagement therewith, holding means for the other of said indicating means, and means comprising a common actuating member for operating said holding means and for swivelling said gear member into engagement with said gear system and for rotating said gear member to operate said gear system.

7. In an indicating instrument, the combination of a housing for said instrument, a pair of graduated concentric dials normally movable in unison about a common axis, a gear system for moving one of said dials relative to the other, a swivelled and rotatable gear member for operating said gear system and normally out of engagement therewith, and means comprising a knob accessible from the exterior of the instrument housing for swivelling said gear member into engagement with said gear system and for rotating said gear member to operate said gear system.

8. In an indicating instrument, the combination of a pair of indicating means normally adapted for angular movement in unison about a common axis, a gear system for moving one of said indicating means relative to the other, a swivelled and rotatable gear member for operating said gear system and normally out of engagement therewith, means comprising a slidable and rotatable rod and pinion thereon engaging said gear member, and means for sliding said rod to swivel said gear member into engagement with said gear system and for rotating said rod to operate said gear system.

9. In an indicating instrument, the combination of a pair of graduated concentric dials normally movable in unison about a common axis, a gear system for moving one of said dials relative to the other, a swivelled and rotatable gear for operating said gear system and normally out of engagement therewith, means comprising a slidable and rotatable member and a pinion thereon engaging said gear, means for sliding said member in one direction to swivel said gear into engagement with said gear system and for rotating said member to operate said gear system, and yieldable means for sliding said member in an opposite direction to swivel said gear out of engagement with said gear system.

10. In combination, a pair of indicating means normally adapted for angular motion in unison about a common axis, driven means for setting one of said indicating means relative to the other, holding means for the other of said indicating means, swivelled driving means for operating said driven means and being normally out of engagement therewith, and common means for swivelling said driving means into engagement with said driven means and for operating said holding means.

11. In combination, a pair of indicating means normally adapted for angular motion in unison about a common axis, driven means for setting one of said indicating means relative to the other, holding means for the other of said indicating means, swivelled driving means for operating said driven means and being normally out of engagement therewith, common means for swivelling said driving means into engagement with said driven means and for operating said holding means; and yieldable means for swivelling said driving means out of engagement with said driven means.

PAUL A. NOXON.

REFERENCES CITED

The following references are of record in the file of this patent:

UNITED STATES PATENTS

| Number | Name | Date |
|---|---|---|
| 1,368,302 | Stevens | Feb. 15, 1921 |
| 1,411,357 | Hornbastel | Apr. 4, 1922 |
| 1,552,938 | Mackey | Sept. 8, 1925 |
| 2,093,417 | Carter | Sept. 21, 1937 |
| 2,099,705 | Riechel | Nov. 23, 1937 |
| 2,406,341 | Beach et al. | Aug. 27, 1946 |